(12) United States Patent
Silverman

(10) Patent No.: US 6,226,668 B1
(45) Date of Patent: May 1, 2001

(54) METHOD AND APPARATUS FOR WEB MESSAGING

(75) Inventor: David Phillip Silverman, Somerville, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/967,929

(22) Filed: Nov. 12, 1997

(51) Int. Cl.[7] .................................................. G06F 15/16
(52) U.S. Cl. ...................... 709/204; 709/205; 709/206; 709/219
(58) Field of Search .............................. 709/204, 205, 709/206, 207, 219; 395/200.34, 200.49; 379/88.16, 88.09

(56) References Cited

U.S. PATENT DOCUMENTS

| 5,487,100 | * | 1/1996  | Kane .................................. 709/206 |
| 5,675,507 | * | 10/1997 | Bobo, II ............................. 709/206 |
| 5,768,513 | * | 6/1998  | Kuthyar et al. ................. 395/200.34 |
| 5,793,972 | * | 8/1998  | Shane .............................. 395/200.49 |
| 5,832,062 | * | 11/1998 | Drake .................................... 379/88 |
| 6,028,917 | * | 2/2000  | Creamer et al. ................ 379/100.01 |
| 6,141,413 | * | 3/1999  | Waldner et al. ..................... 379/265 |

* cited by examiner

Primary Examiner—Krisna Lim
Assistant Examiner—Chuong Ho
(74) Attorney, Agent, or Firm—Oliff & Berridge, PLC

(57) ABSTRACT

A web messaging system allows a subscriber to receive messages from a wide variety of multimedia sources. If a caller attempts to contact a subscriber but the subscriber is unavailable, the system will record the message in digital format, generate a web page and password, and send a web page identification and password to the subscriber via a paging medium. The subscriber can then access the web page, enter the password, and retrieve the message.

24 Claims, 5 Drawing Sheets

METHOD AND APPARATUS FOR WEB MESSAGING

BACKGROUND OF THE INVENTION

1. Field of Invention

This invention relates to sending and retrieving multimedia messages.

2. Description of Related Art

Multimedia services have become increasingly popular. Video, e-mail and facsimiles, for example, are just a few of the wide range of multimedia services available. Thus, sending and retrieving multimedial messages are desirable for all forms of telecommunication. However, not all types of telephones, computers, and other electronic equipment are capable of handling every variety of multimedia available.

Since not all electronic equipment is capable of handling multimedia services, sending and retrieving multimedia messages over telephone lines such as long distance lines, for example, may be impractical or even impossible. In addition, the cost of long distance service in order to send and retrieve these messages may be prohibitive.

SUMMARY OF THE INVENTION

The invention provides a system that includes a method and apparatus for sending and retrieving multimedia messages. When one party attempts to contact another party, but that party is unavailable, the system records the message in digital format. After the message is recorded, the system creates a web page, secures it with a password, preferably a random password, and sends an identification of the web page and the password to the recipient via a paging system, for example, or, alternatively, leaves a voice mail message with the information at a specified location. The called party can then access the web, enter the password, and view the message that was left.

The invention provides flexibility so that the message may be sent over the Internet, for example. Alternatively, the current telecom company can also participate, using current phone lines and equipment. In addition, instead of accessing a mailbox which requires permission from a subscriber, the system can create a web page that is accessible to any web server.

BRIEF DESCRIPTION OF THE DRAWINGS

The invention is described in detail with reference to the following drawings, wherein like numerals represent like elements, and wherein.

DETAILED DESCRIPTION OF PREFERRED EMBODIMENTS

Figure 1:
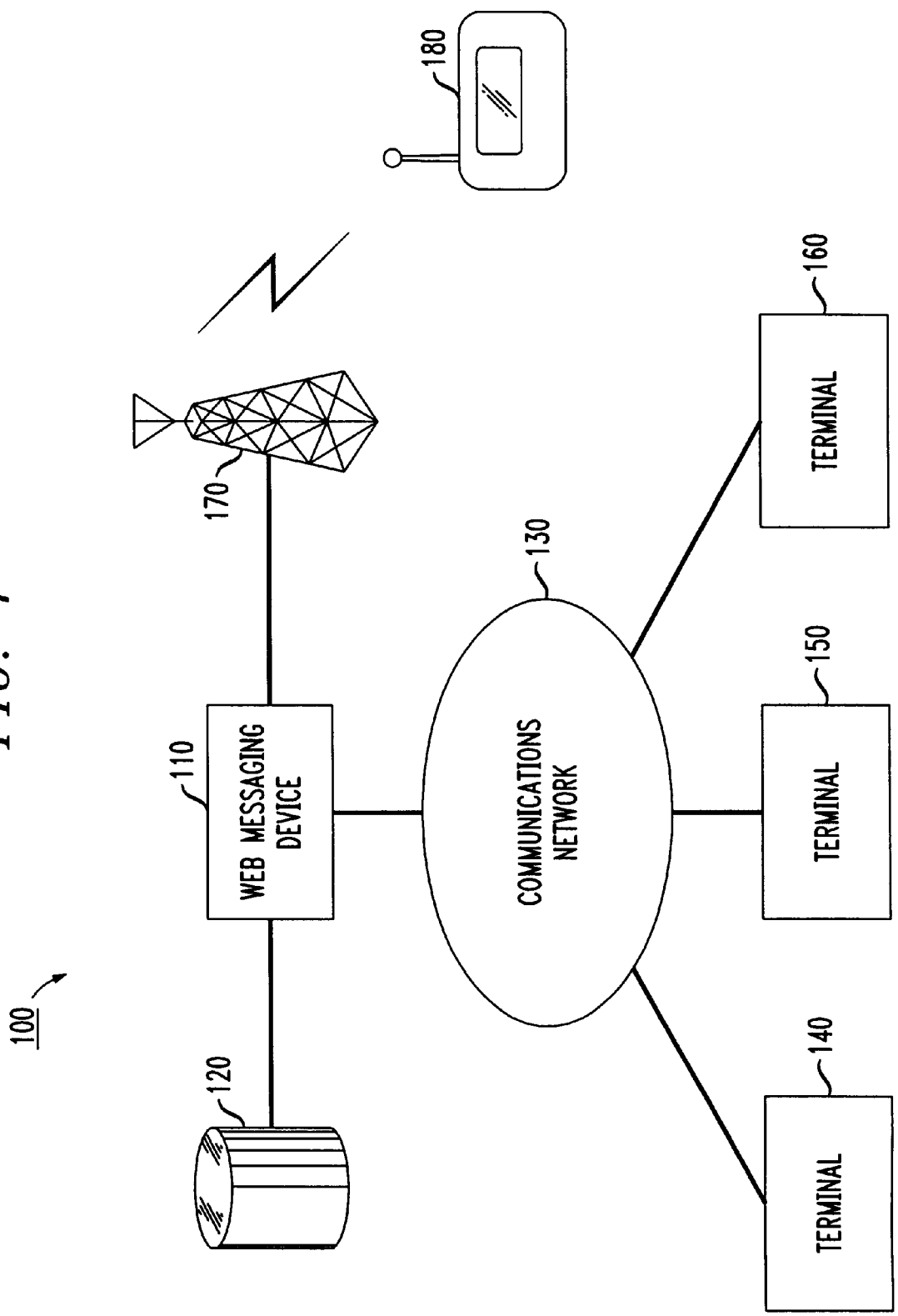
FIG. 1 is a block diagram of an exemplary web message system.

FIG. 1 shows an exemplary embodiment of a web message system 100 that includes a communications network 130 connected to several communication terminals 140, 150 and 160. The communication terminals 140, 150 and 160 may represent telephone stations, personal computers, or any other device which may send and receive communications. The communications network 130 is also coupled to a web messaging device 110. When distributed, servers of the communications network 130 interface with the terminals 140, 150 and 160 and serve as control units of the web messaging device 110 performing all of its functions. For the following description, the web messaging device 110 is assumed to be centralized for ease of discussion.

The web messaging device 110 is connected to a database 120. The database 120 can be stored on any memory device internal or external to the web messaging device 110. The web messaging device 110 is coupled to a wireless communications tower, such as pager tower 170 or a mobile base station for cellular phones which provides broadcasting capabilities to wirelessly communicate with portable communication devices, such as a pager 180.

A first party uses the terminal 140 in an attempt to contact (or calls) a second party at the terminal 160. The terminal 140 calls the terminal 160 through the communications network 130 and the web messaging device 110. The web messaging device 110 determines if terminal 160 answered the call. If the terminal 160 does not answer the call (e.g., remains on-hook), the web messaging device 110 queries the database 120 to determine whether the second party is a subscriber. If the second party is not a subscriber, the web messaging device 110 connects the terminals 140 and 160 together through the communications network 130 so that features subscribed to by either party may be performed, for example.

If the second party is a subscriber, the web messaging device 110 retrieves subscriber profile information from the database 120 and solicits a message from the first party. If the first party decides to leave a message, the message is received by the web messaging device 110 through the communications network 130 and is stored in database 120. Alternately, an automated message may be generated or simply a notification that the first party called may be provided by the web messaging device 110, for example. The web messaging device 110 then generates a web page and password.

The web messaging device 110 notifies the subscriber (second party) via the method specified in the subscriber profile information stored in database 120. The subscriber is notified by sending the web page identification of the generated web page and the password to the subscriber via the paging tower 170 and the pager 180, via a voice mailbox or the computer terminal 150, in accordance with the subscriber profile information.

Figure 2:
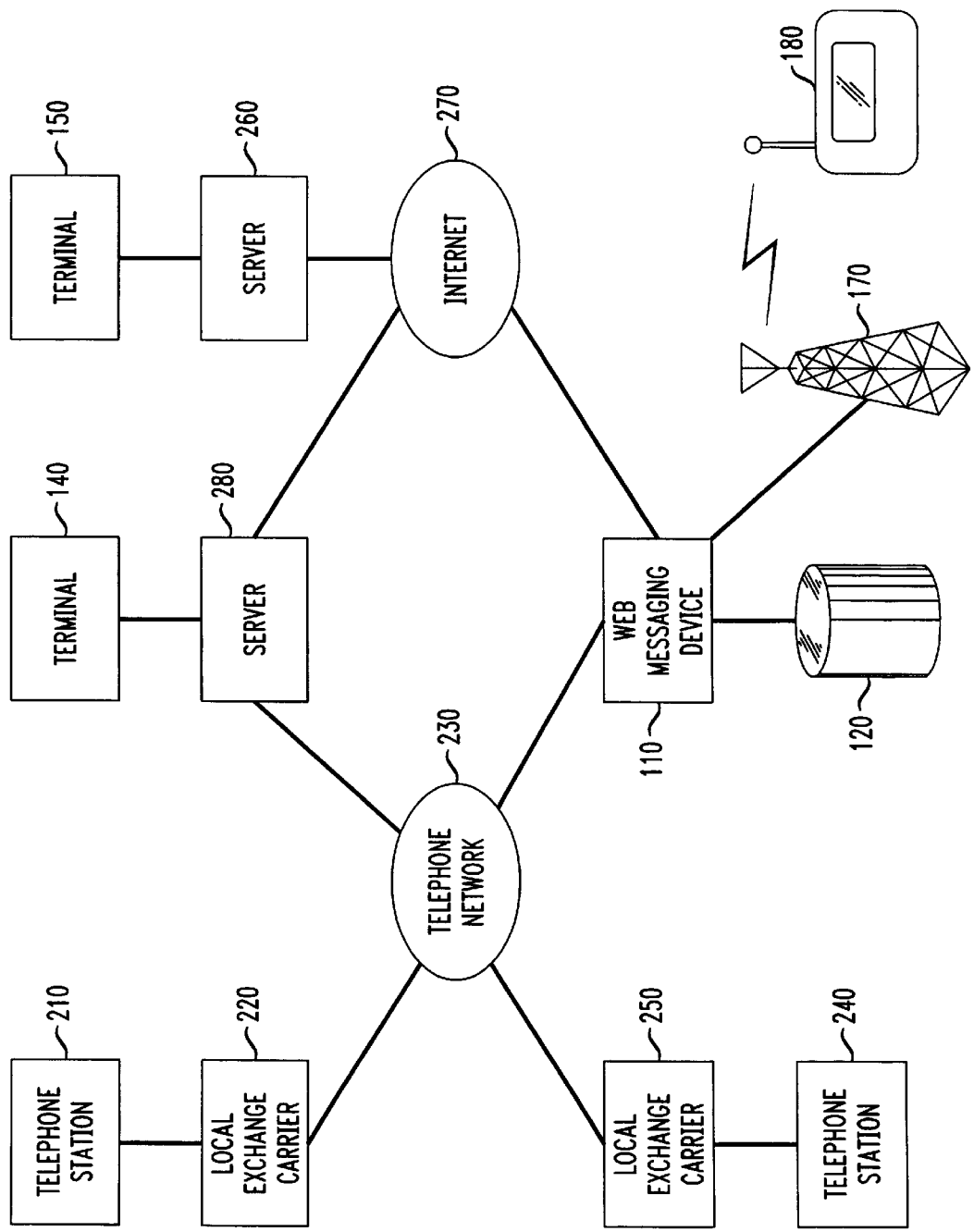
FIG. 2 is a specific example of the web message system shown in FIG. 1.

FIG. 2 shows a specific example of the web message system 100 shown in FIG. 1. Telephone network 230 is connected to telephone stations 210 and 240 via local exchange carriers 220 and 250, respectively. The telephone network 230 is also coupled to the web messaging device 110 and terminal 140 through server 280.

The web messaging device 110 is connected to a database 120 and is also coupled to a wireless communications tower, such as pager tower 170 or a mobile base station which provides broadcasting capabilities to wirelessly communicate with portable communication devices, such as a pager 180. The web messaging device 110 is further connected to the Internet 270. The Internet 270 is connected to terminals 140 and 150 through servers 280 and 260, respectively. When a caller, using the telephone station 210, calls a subscriber at the telephone station 240, the call is routed through the telephone network 230 and the web messaging device 110. The web messaging device 110 monitors the terminal 240 to determine whether the subscriber answers the call. If the subscriber does not answer the call (i.e., after a predetermined number of rings), then the web messaging device 110 performs the functions as shown in FIG. 3 and discussed below.

If the web messaging device 110 determines that the called party is a subscriber, the web messaging device 110 retrieves the subscriber profile information from the database 120 and solicits the caller to leave a message for the subscriber. The web messaging device 110 receives the message from the caller through telephone network 230 and stores in the message in the database 120.

Figure 3:
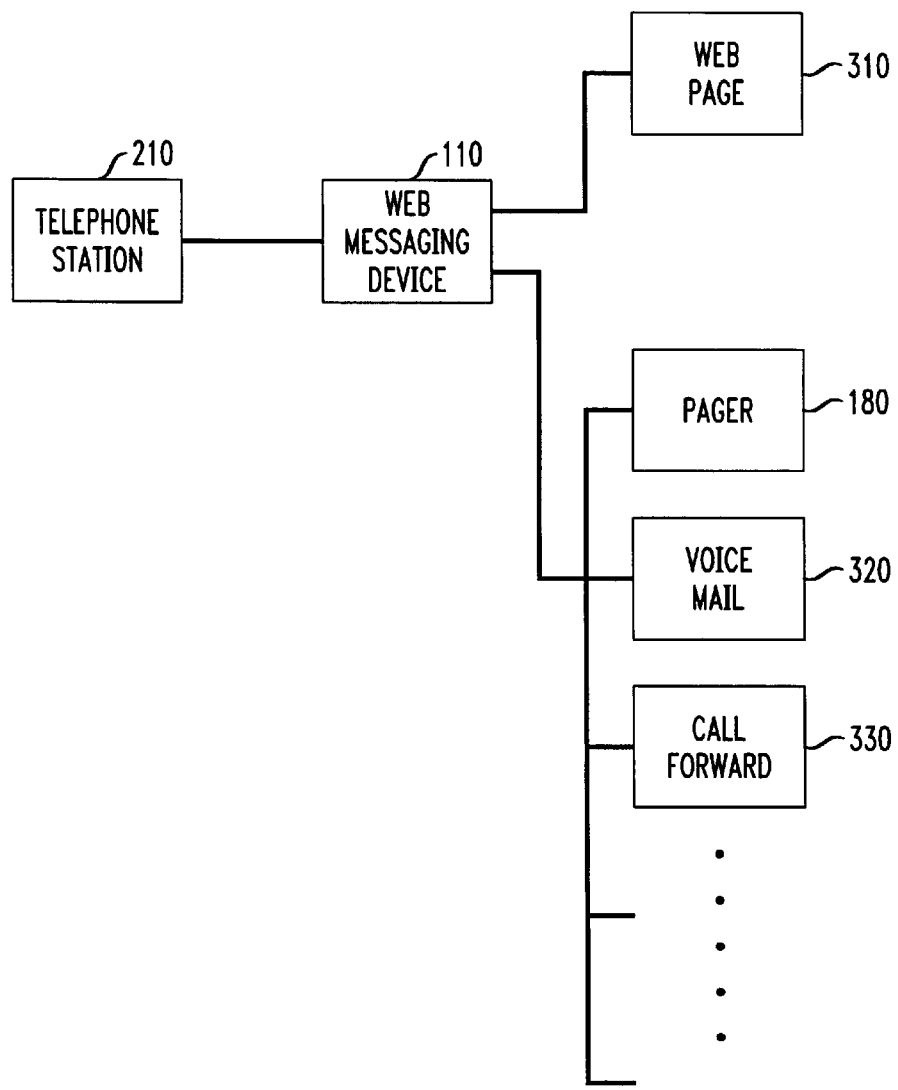
FIG. 3 is a diagram illustrating the outputs of the web messaging device.

After receiving the message, the web messaging device 110 generates a web page, as indicated in block 310 of FIG. 3, and a password that correspond to the message and stores them in the database 120. The web messaging device 110 notifies the subscriber in accordance with the subscriber profile information stored in database 120. For example, the web messaging device 110 can send the web page identification and the password information to a pager 180 via paging tower 170. Alternatively, the web messaging device 110 can send the web page identification and password information to a voice mail/answering service connected to telephone station 240, block 320 of FIG. 3, or directly to the subscriber at telephone station 240, block 330 of FIG. 3. The web messaging device 110 can also send the web page identification and the password information to an alternate computer terminal 140, located in the subscriber's work or home, for example, through that terminal's Internet server 280.

Figure 4:
FIG. 4 is an illustration of a sample web page.

A sample web page 400 is shown in FIG. 4. The web page 400 can be any data network page, such as a World Wide Web (WWW) page, for example. The web page 400 may be generated by any server in the web message device 110. If the web message device 110 is distributed throughout the Internet 270, for example, any distributed portion such as an Internet server may generate this web page 400.

There are many known methods for creating the web page 400. For example, the web page 400 may be a static web page created when the web messaging device 110 is brought on-line and messages are placed under this static page. The web page also may be generated dynamically following instructions of the subscriber in the subscriber profile. For example, the subscriber may choose a particular graphics display to either attract or repel other parties on the Internet 270.

The password for the web page 400 may be created automatically by using a random number generator, for example, or may be pre-specified by the subscriber in the subscriber profile. The password is associated with the message and access to the message is denied unless the associated password is entered. When a subscriber requests for the message, for example, the web messaging device 110 receives the password and retrieves the message that corresponds to the entered password for delivery to the subscriber.

A particular example below shows the web messaging device 10 paging the subscriber with the web page identification and the password information. The pager 180 may read, for example:

Message from (123)456-7890@
www.ATT.com (subscriber's account # and message #)
Password: 12345

In order to retrieve the message, the subscriber accesses the web page www.ATT.com (subscriber's account # and message #) and enters the password via computer terminal 150 and server 260, for example. The web messaging device 110 retrieves the message and sends the message to the computer terminal 150 for display to the subscriber.

The web messaging device 110 may also send other information to the subscriber in addition to the web page identification and password. For example, the caller's number may be recognized by the web messaging device 110 via the caller ID feature, such as Automatic Name Identification (ANI), and the web messaging device 110 may forward the caller's name, phone number, etc. to the subscriber.

Figure 5:
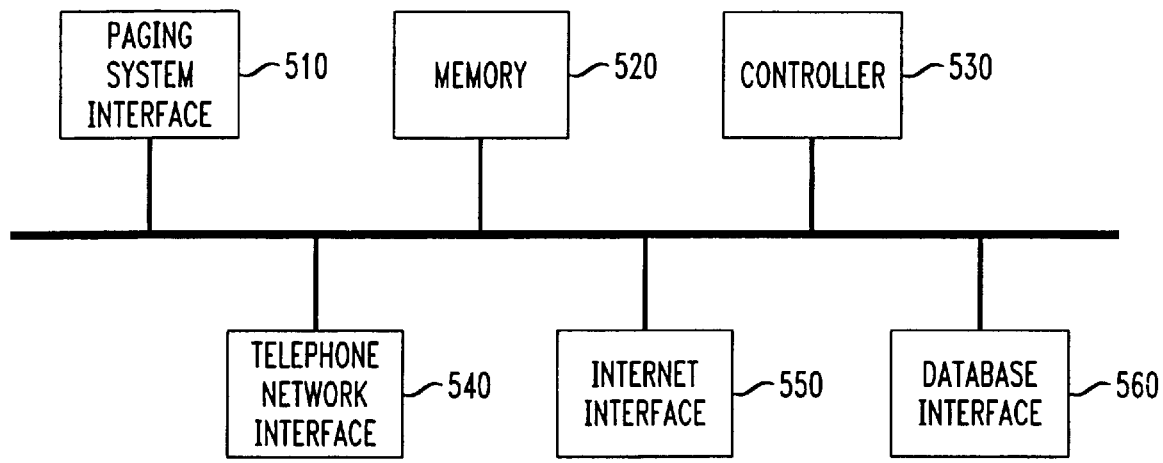
FIG. 5 is a block diagram of the web messaging device.

FIG. 5 is a block diagram of the web messaging device 110. The web messaging device 110 may include a controller 530, a memory 520, a telephone network interface 540, an Internet interface 550, a paging system interface 510 and a database interface 560. The above-elements of the web messaging device 110 may found as part of a single standalone unit or may be distributed as a part of a local exchange carrier, for example.

When a caller calls the subscriber, the call is received by the controller 530 through the telephone network interface 540. The controller 530 monitors the call using a timer or by counting the number of rings, for example. If the call is not answered by the subscriber before the timer expires, the controller 530 retrieves the subscriber profile information corresponding to the subscriber from either the memory 520 or an external database through the database interface 560.

The controller 530 solicits a message from the caller via telephone network interface 540. If the caller decides to leave a message for the subscriber, the controller 530 receives the message through communications network interface 540. The controller 530 digitizes and stores the message in the memory 520 or to the external database through database interface 560. If the caller does not leave a message, the controller 530 may generate and store an automated message, for example.

The controller 530 retrieves the subscriber's profile from the memory 520 or from the external database through database interface 560. The controller 530 generates a web page and associates the caller's message with the generated web page. The controller 530 either generates a password or retrieves a subscriber-selected password from the subscriber's profile and secures the caller's message with the password. The web page and the password are stored in memory 520 or in the external database through database interface 560.

The controller 530 retrieves from the subscriber profile the subscriber's preferred method for notification. For example, if the subscriber profile indicates that paging is the preferred method, the controller 530 pages the subscriber sending the web page identification and the password through the paging system interface 510. Alternatively, the web page identification and the password may be sent to the subscriber's voice mailbox through telephone interface 540, or to an alternate computer terminal via Internet interface 550.

Figure 6:
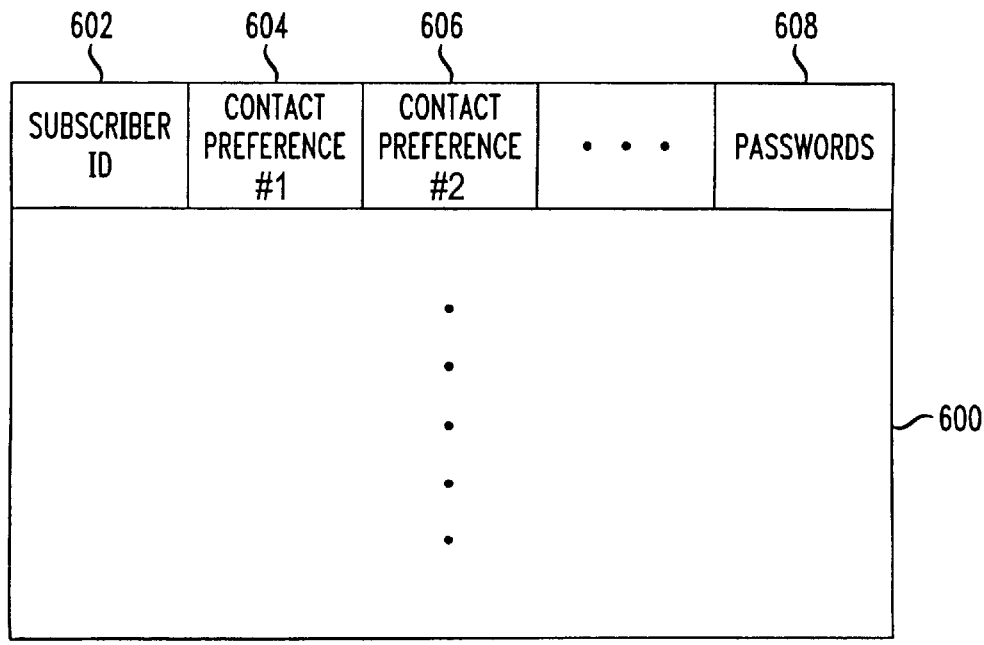
FIG. 6 is a diagram illustrating sample subscriber profile information for the web messaging device.

FIG. 6 illustrates a sample of the subscriber profile information 600 which may be stored in database 120. For example, the subscriber profile 600 may include the subscriber's ID number 602, a number of contact preferences 604–606 which are methods by which the user wishes to have the web page identification and the password communicated, such as by pager, voice mail, etc.

In this manner, a subscriber can give the web messaging device 110 several customized options on how the subscriber may be notified so that vital messages will not be missed or delayed. The controller 530 will attempt to notify a subscriber with the web page identification and password by a first preferred method 604 (paging, for example) and if the subscriber does not respond within a predetermined time period, the controller 530 will attempt to notify the subscriber by a second preferred method 606 (voice mail, for example). If the controller 530 is not successful in leaving the web page identification and the password for the subscriber, the caller is notified that the subscriber could not be notified and that the message was not left. The controller 530 would then discard the message.

For example, if the contact preference #1 604 is paging and the contact performance #2 606 is voice mail, the web messaging device 110 first pages the subscriber. If the subscriber does not respond within a predetermined time, the web messaging device 110 leaves a voice mail message. However, if voice mail is does not answer, the caller is notified by the web messaging device 110 that the subscriber was not reached and that no message was left.

In addition, the subscriber profile 600 may include personalized passwords 608 to secure the message. Thus, the subscriber may have the freedom to select passwords because they are easy to remember, or they assist the subscriber in easily identifying particular messages, for example.

Figure 7:
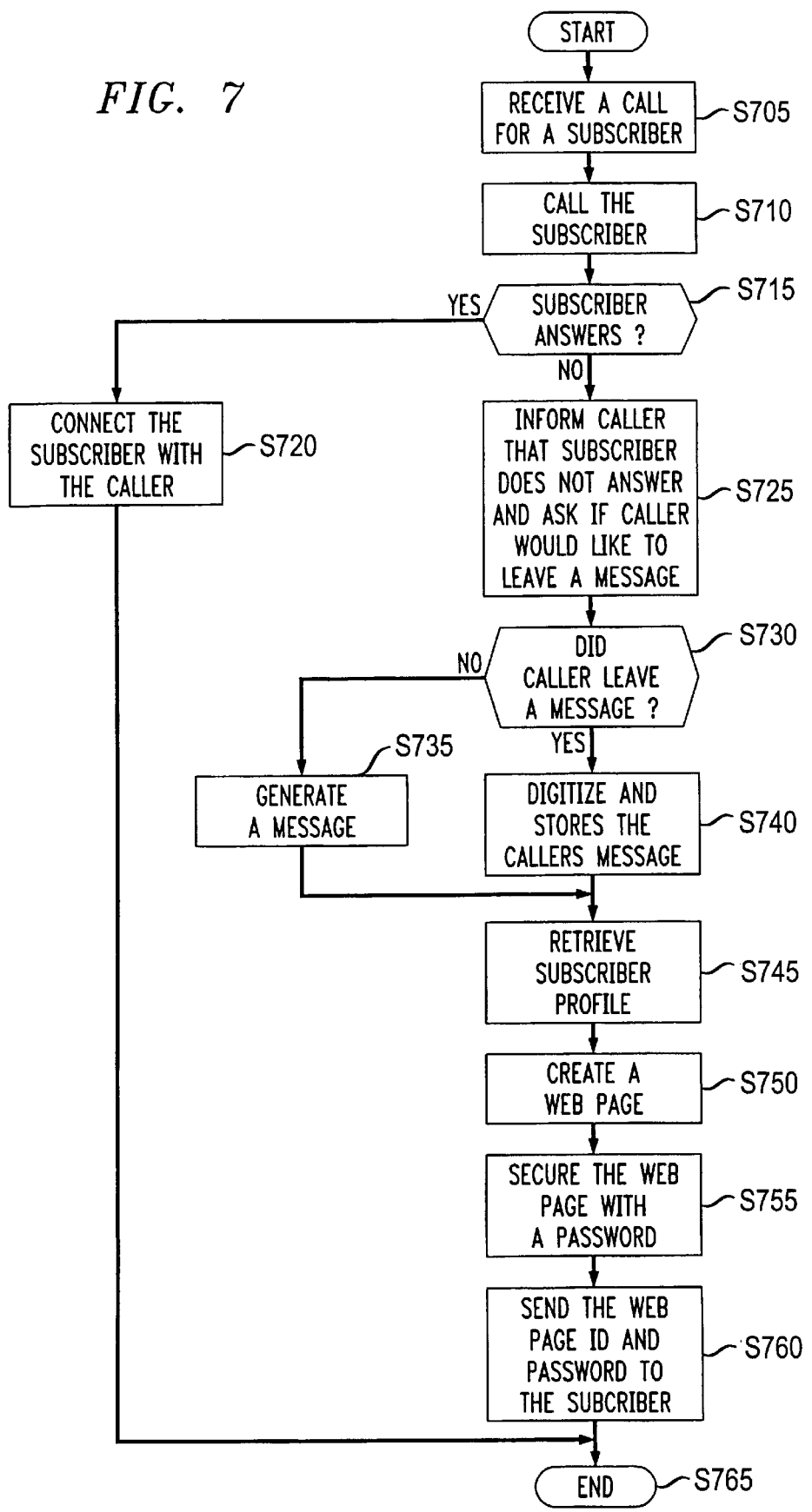
FIG. 7 is a flowchart of the web messaging process.

FIG. 7 is a flowchart describing the web messaging device process. At step S705, the controller 530 receives a call for the subscriber and goes to step S710. At step S710, the controller 530 calls the subscriber and goes to step S715. At step S715, if the subscriber answers, the controller 530 goes to step S720; otherwise, the controller 530 goes to step S725. At step S720, the controller 530 connects the caller with the subscriber and goes to step S765 and ends.

At step S725, the controller 530 informs the caller that the subscriber is not available by outputting a message, for example, prompts the caller to leave a message, and goes to step S730. At step S730, the controller 530 determines whether the caller left a message. If the caller did not leave a message, the controller 530 generates a message and jumps to step S745. If the controller 530 determines that the caller left a message, the controller 530 records, digitizes and stores the caller's message in the memory 520 or in the external database via the database interface 560 and goes to step S745. At step, S745, the controller 530 retrieves the subscriber's profile and goes to step S750.

At step S750, the controller 530 creates a web page and goes to step S755. At step S755, the controller 530 secures the message with a password and goes to step S760. At step S760, the controller 530 notifies the subscriber of the web page identification and password based on the subscriber's profile retrieved at step S745, via a pager, for example, and goes to step S765 and ends.

The web messaging device 110 may be implemented on a programmed general purpose computer. However, the web messaging device 110 may also be implemented on a special purpose computer, a programmed microprocessor or microcontroller and peripheral integrated circuit elements, and Application Specific Integrated Circuits (ASIC) or other integrated circuits, a hardwired electronic or logic circuit, such as a discrete element circuit, a programmable logic device such as a PLD, PLA, FGPA, or PAL, or the like. Furthermore, the functions of the web messaging device 110 may be performed by a standalone unit or distributed throughout the communications network 130. In general, any device with a finite state machine capable of performing the functions of a web messaging device 110, as described herein, can be implemented.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method for operating a web page message service in a data network for handling a call from a party to a subscriber in a communications network, comprising:

receiving the call from the party in a web message device;

generating a web page in the data network if the call is not answered;

prompting the party for a message;

storing the message under the web page; and transmitting an identification of the web page to the subscribers,
wherein if the party leaves the message, the web message device stores the message under the web page, and if the party does not leave the message, the web message device generates the message and stores the message under the web page.

2. The method of claim 1 further comprising digitizing the message if the party leaves the message.

3. The method of claim 1, further comprising retrieving a subscriber profile from a database.

4. The method of claim 3, wherein the generating step comprises:

searching the subscriber profile for web page generating instructions;

constructing the web page based on the web page generating instructions if found; and retrieving a predetermined web page if the web page generating instructions are not found.

5. The method of claim 3, further comprising:

generating a password; and securing the message with the password.

6. The method of claim 5, further comprising:

searching the subscriber profile for password instructions;

constructing the password based on the password instructions if found; and constructing the password based on a predetermined algorithm if the password instructions are not found.

7. The method of claim 6, wherein the predetermined algorithm includes a random number algorithm, the password being a random number generated by the random number algorithm.

8. The method of claim 3, wherein the transmitting step comprises:

retrieving at least one subscriber contact preference in priority order from the subscriber profile;

sending an identification of the web page to the subscriber starting with a highest priority contact preference; and sending the identification of the web page to the subscriber via a next lower priority contact preference if the subscriber does not answer a higher priority contact preference and if more than one subscriber contact preference is found.

9. The method of claim 8, further comprising notifying the party that the message is deleted after exhausting all subscriber contact preferences without contacting the subscriber.

10. The method of claim 8, wherein the transmitting step further comprises sending a password that secures the message with the identification of the web page to the subscriber.

11. The method of claim 10, wherein the storing step stores the party's identification information and the transmitting step transmit the party's identification information to the subscriber.

12. The method of claim 8, wherein the at least one subscriber contact reference includes voice mail, paging, a telephone call, or e-mail.

13. A web message service device operating in a data network receiving a call from a party in a communication network for a subscriber, comprising:

a memory; and a controller coupled to the memory, wherein the controller receives the call from the party, generates a web page in the data network if the call is not answered, prompts the party for a message, stores the message under the web page, and transmits an identification of the web page to the subscriber, wherein if the party leaves the message, the controller stores the message in the memory under the web page, and if the party does not leave the message, the controller generates the message and stores the message under the web page.

14. The device of claim 13, wherein the controller digitizes the message if the party leaves the message.

15. The device of claim 13, wherein the controller retrieves a subscriber profile from the memory.

16. The device of claim 15, wherein the controller searches the subscriber profile for web page generating instructions, constructs the web page based on the web page generating instructions if found, and retrieves a predetermined web page if the web page generating instructions are not found.

17. The device of claim 15, wherein the controller generates a password and secures the message with the password.

18. The device of claim 17, wherein the controller searches the subscriber profile for password instructions, the controller constructing the password based on the password instructions if found, and constructing the password based on a predetermined algorithm if the password instructions are not found.

19. The device of claim 18, wherein the predetermined algorithm includes a random number algorithm, the password being a random number generated by the random number algorithm.

20. The device of claim 15, wherein the controller retrieves at least one subscriber contact preference in priority order from the subscriber profile, sends an identification of the web page to the subscriber starting with a highest priority contact preference, and sends the identification of the web page to the subscriber via a next lower priority contact preference if the subscriber does not answer a higher priority contact preference and if more than one subscriber contact preference is found.

21. The device of claim 20, wherein the controller notifies the party that the message is deleted after exhausting all subscriber contact preferences without contacting the subscriber.

22. The device of claim 20, wherein the controller sends a password that secures the message with the identification of the web page to the subscriber.

23. The device of claim 22, wherein the controller stores the party's identification information in the memory and then transmits the party's identification information to the subscriber.

24. The device of claim 20, wherein the at least one subscriber contact preference includes voice mail, paging, a telephone call, or e-mail.

* * * * *